(No Model.)
E. Y. MOORE.
AUTOMATIC BRAKE FOR PULLEY BLOCKS.
No. 545,088. Patented Aug. 27, 1895.
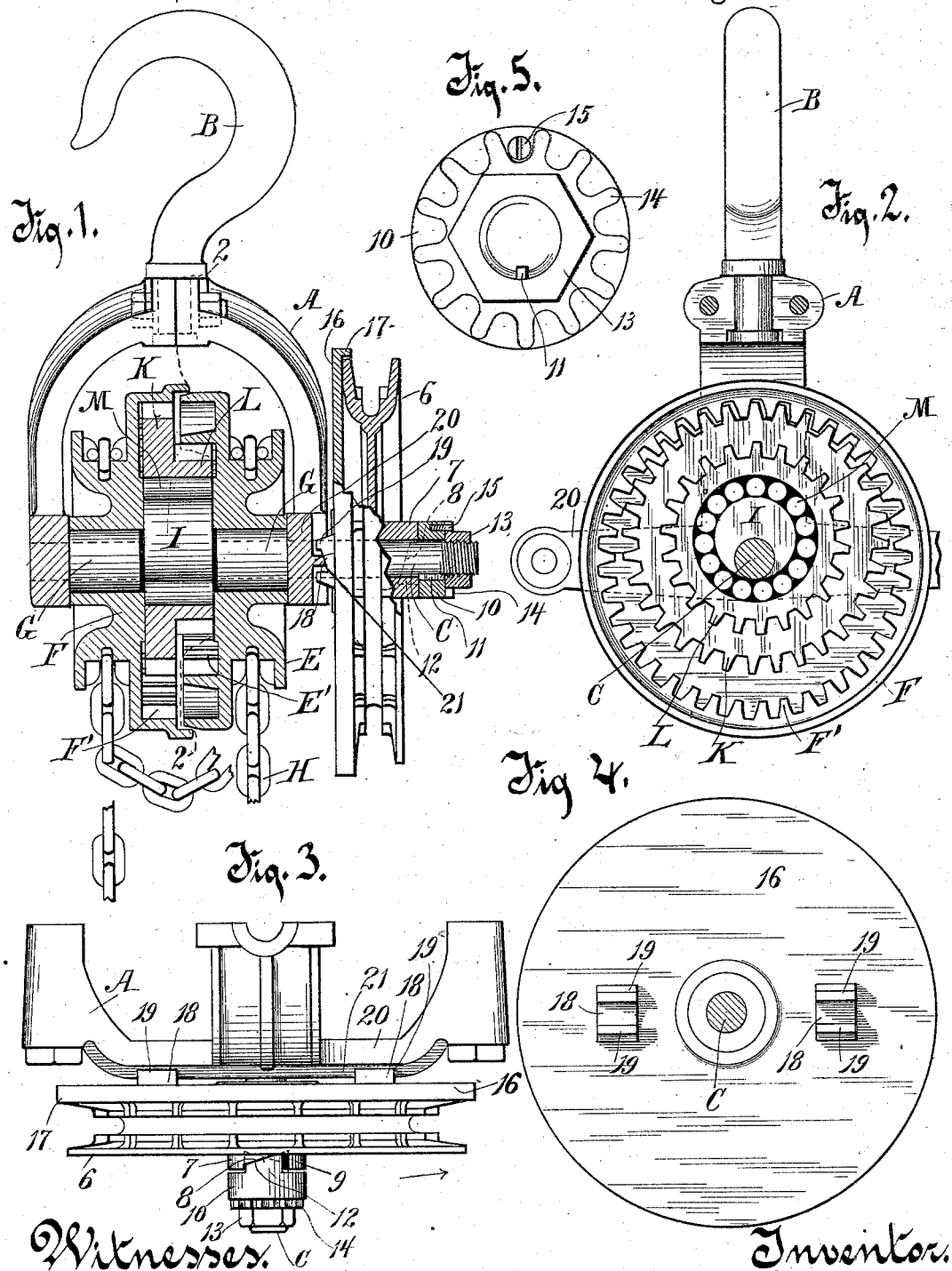

UNITED STATES PATENT OFFICE.

EDWARD Y. MOORE, OF MILWAUKEE, WISCONSIN.

AUTOMATIC BRAKE FOR PULLEY-BLOCKS.

SPECIFICATION forming part of Letters Patent No. 545,088, dated August 27, 1895.

Application filed April 2, 1894. Serial No. 505,983. (No model.)

*To all whom it may concern:*

Be it known that I, EDWARD Y. MOORE, of Milwaukee, in the county of Milwaukee and State of Wisconsin, have invented a new and useful Improvement in Automatic Brakes for Pulley-Blocks, of which the following is a description, reference being had to the accompanying drawings, which are a part of this specification.

My invention has relation to improvements in automatic brakes for pulley-blocks.

The object of the improvements is to provide a simple and effective automatic brake for differential and other pulley-blocks, being particularly adapted, although not necessarily, to the differential pulley-block fully described in the United States Patent issued to me under date of January 26, 1892, and numbered 467,513. I therefore show my improvements in connection with a differential pulley-block, such as that described in my aforementioned Letters Patent, to which Letters Patent I refer for any details of description not found in the following specification, only so much of my former invention being illustrated and described herein as is necessary to explain the immediate improvements involved in my present invention.

The improvements consist in the devices and parts or their equivalents, as hereinafter fully described and claimed.

In the accompanying drawings, Figure 1 is a view, partly in elevation and partly in vertical section, of the differential pulley-block illustrated in my United States Letters Patent No. 467,513, showing my improved automatic brake mechanism in connection therewith. Fig. 2 is a section on the line 2 2 of Fig. 1, looking toward the left. Fig. 3 is a detail plan view of my improved brake mechanism. Fig. 4 is an inner face view of the disk, and Fig. 5 is an end view of the adjusting-nut and allied mechanism.

Like letters and numerals of reference denote like parts throughout the several views.

Referring now particularly to the differential pulley-block mechanism covered in my former Letters Patent, above mentioned, A is the frame of the pulley-block, which is of suitable size and form to support the operative mechanism. A hook B is swiveled in the top of the frame and is adapted for suspending the pulley-block. An axle C is journaled in the frame. Two chain-wheels E and F of equal diameter are loose on the studs or bosses G, which being pierced centrally by the axle C, are in the nature of sleeves about the axle, the bosses being integral with or rigid to the frame. The wheels E and F are concentric with the axle C. A chain H runs on the two wheels E and F, the chain being so arranged that it runs over one wheel, as E, from front to rear or from rear to front, and is carried diagonally beneath the wheels to the other wheel F and runs over that wheel in the same direction from front to rear or from rear to front. The load is supported conveniently by a yoke (not shown in the drawings) attached to the free ends of the chain, which yoke, supporting the load, rises and falls evenly, the extremities of the chain to which it is attached being bent from the wheels on the two sides of the axle C. Interposed between the wheels E and F a cylindrical eccentric I, fixed on the shaft C, rotates therewith, and two cog-wheels, a greater wheel K and a smaller wheel L, constructed integrally with each other and concentric with the eccentric I are thereby carried around the axle C and rotate on the eccentric on the antifriction-rollers M, interposed between the wheels and the eccentric. The chain-wheel E is provided with an internal cog-wheel gear E', which meshes with the teeth of the smaller cog-wheel L; but the gear E' is considerably larger and contains more teeth than the cog-wheel L. The chain-wheel F is provided with an internal gear F', which meshes with the cog-wheel K, but which is larger and contains more teeth than the cog-wheel K does. The teeth on the wheels E and L and the teeth on the wheels F and K, that respectively mesh with each other, are constructed with the same pitch and are so proportioned as not to wedge upon, strain, or unduly grind each other. These several wheels and their supporting devices are so constructed and arranged that the wheels L and K, as they roll around the axle C with the eccentric I, are constantly in mesh with the wheels E and F on that side of the axle at which the eccentric has the greatest radius and are otherwise out of gear therewith.

The above being a description of the parts of my differential pulley-block covered in Letters Patent No. 467,513, dated January 26, 1892, I will now proceed to describe my improved automatic brake which I prefer to employ in connection with said differential pulley-block, the parts constituting the brake mechanism being indicated by reference-numerals.

In the Letters Patent above referred to a plain chain-wheel was fixed on the end of the shaft C, around which wheel an endless chain passed, said chain adapted for rotating the wheel by hand for operating the mechanism. In the present improvement I employ a chain-wheel 6, which is loose on the shaft C, said wheel provided with an outwardly-extending hub 7, the outer edge of which being provided with a series of notches or recesses 8, the rear bordering edges of said notches or recesses being beveled or inclined, as indicated at 9.

The numeral 10 indicates a collar on the shaft C, which collar is keyed to said shaft by means of a spline or feather 11. The collar is provided with a series of inwardly-extending teeth 12, which fit into and are of less width than the notches or recesses 8, so as to have limited play therein. The ends of the teeth are also inclined or beveled to register with the inclines or bevels of the recesses. Turning upon the screw-threaded extremity of the shaft C, against the collar 10, is a nut 13, which nut at its inner end is formed or provided with a series of annularly-arranged radial teeth 14, between any two of which teeth a screw 15 is adapted to be passed and to enter the face of the collar.

Centered loosely on the inwardly-extending portion of the hub of the wheel 6, and adjacent to the inner side of said wheel, is a friction-plate 16. The edge of this plate is flanged outward, as indicated at 17, which flange overlaps one peripheral edge of the chain-wheel 6. The back of the plate is formed, at diametrically-opposite points, with beveled or inclined lugs 18 18. These lugs are provided at their upper and lower ends with outwardly-extending confining shoulders 19 19. A fixed part 20, constituting a transverse arm of the frame A of the pulley-block, is located adjacent to the inner face of the plate and is provided longitudinally with an inclined or beveled wedging rib or surface 21, which fits between the shoulders 19 of the lugs 18, and against the beveled surfaces of said lugs. An endless chain (not shown in the drawings) runs around the wheel 6 and is adapted for rotating the wheel by hand for operating the mechanism. The load, of course, is suspended on the extremities of the chain H.

While in a differential pulley-block of the form herein shown and described, by reason of the peculiar construction and arrangement of the several wheels and their bearings, the leverages and resistance are such that the danger of reversing the motion of the apparatus or the danger of the load running down by gravity after the chain operating the wheel 6 has been released is reduced to the minimum, yet the provision of my improved automatic brake, in connection with this particular form of pulley-block, as well as in connection with various other forms of blocks, will absolutely insure against the contingency above pointed out.

In the operation of my improvement when it is desired to raise the load a pull is given to the hand-chain in order to turn the chain-wheel 6 to the right or in the direction of the arrow, Fig. 3. When thus turned the wheel has a limited rotary motion independent of the axle until the hub-inclines are tightened against the complimentary inclines of the teeth of the collar 10, and as said collar is fast on the axle C, the wheel, collar, and axle are rotated together. As the wheel is thus turned to the right the plate 16 will also be turned slightly in the same direction (by reason of the frictional contact of said wheel with the plate) to the extent permitted by the stop-shoulders 19. This movement of the plate to the right has the effect of loosening the wedge connection formed by the inclined surfaces 18 18 and the inclined or beveled rib 21 of the fixed part, and which, for convenience I will term throughout "the plate wedge," inasmuch as the inclined surfaces 18 18 are inclined or beveled, respectively, in opposite directions, as shown by dotted lines in Fig. 4, and in such manner as by the slight turning of the plate to the right the wedge will be loosened, as above explained. It will, therefore, be seen that by pulling on the hand-wheel to the right to raise the load the wheel turns freely with the axle and without any retarding influence from the friction-plate, because only the hub-wedge is locked. Now, if it is desired to lower the load a pull is given to the opposite side of the hand-chain, in order to turn the wheel 6 to the left. The turning of the wheel in this direction of course loosens the wedge connection formed by the beveled notches of the hub of the wheel 6 and by the beveled teeth of the collar, and which for convenience will be styled the "hub-wedge," but at at the same time tightens the plate-wedge, by reason of the frictional contact of the wheel with the plate, and the consequent turning of the latter limitedly to the left, to thereby lock the inclines forming the plate-wedge. It will, therefore, be seen that by pulling on the hand-wheel to the left to lower the load the wheel also turns, because only the plate-wedge is locked, but yet, at the same time, this plate-wedge creates a sufficient retarding friction in this instance to prevent the too rapid descent of the load, which, of course, is desirable when lowering. When the power applied to the hand-chain is removed the wheel 6 for an instant is in a state of inertia. The downward pull of the load carried by the extremities of the chain H, however, causes the rotation of the axle C to the left. The wheel being at rest, however, the turning of the axle toward the left tightens the hub-wedge. The effect of rotating the wheel 6 to the left being also, as before explained, to tighten the plate-wedge, it therefore follows that when the axle C is rotated to the left from the tendency of the block to run down, the plate-wedge as well as the hub-wedge is tightened. Both wedges being tightened a sufficient friction between the wheel and the plate is produced to entirely stop the descending load. It will therefore be seen that when the movement emanates from the main axle, as it does by the downward pulling of the load, then the moving of the shaft to the left locks the hub-wedge, and that carries the wheel and friction-plate around and locks the plate-wedge, the locking of both wedges in this manner setting the brake. When the load is thus suspended and at rest, with both the wedges locked, if a pull is given on the hand-chain to turn the wheel to the left, the hub-wedge will be at once released and remain released just so long as the hand-chain pulls the wheel over faster than the axle travels to catch up with it. As soon as the pull on the hand-chain to lower the load stops the axle overtakes it and sets up the hub-wedge again, which turns the wheel into contact with the plate sufficiently to carry that over and wedge that also.

The function of the nut 13 is to adjust the collar 10 in or out on the axle C, and to consequently cause the teeth of said collar to impinge against the edges of the notches or recesses 8 of the hub of the wheel 6 with more or less frictional contact. In order to adjust the nut the screw 15 is removed and the nut turned in the desired direction and to the proper extent, after which the screw is again turned into place between the space of two teeth.

It is obvious that many of the details of construction may be varied or changed without departing from the spirit or scope of my invention, and I therefore do not wish to be understood as limiting myself to the specific details of construction herein set forth and described.

Having thus described my invention, what I claim, and desire to secure by Letters Patent, is—

1. In an automatic brake for pulley blocks, the combination, of a frame, a main axle passing freely through the frame, a chain wheel loose on the main axle, a friction plate also loose on said axle, and mounted thereon to one side of the wheel, a wedging connection between the plate and the frame, said wedging connection when the wheel is turned in one direction to lower the load constructed to be tightened, whereby the plate is thrown in firm frictional contact against the adjacent side of the wheel, and said wedging connection when the wheel is turned in the opposite direction to raise the load adapted to be loosened, a part fixed on the axle and constructed to engage the opposite side of, and to rotate the wheel, a wedging connection being formed between said part and the wheel, which connection when the wheel is turned in the direction to lower the load is adapted to be loosened or disengaged simultaneously with the tightening or engaging of the first-named wedging connection, and to be tightened or engaged to act against the adjacent side of the wheel, as said wheel is turned in the opposite direction to raise the load, simultaneously with the loosening of said first-named wedging connection, and a lifting sheave, the downward pull of the load thereon, when the chain wheel is in a state of inertia, being adapted to turn the main axle, and thereby tighten both wedging connections, and prevent the descent of the load, substantially as set forth.

2. In an automatic brake for pulley blocks, the combination, of a frame, a main axle passing freely through the frame, a chain wheel loose on the main axle and provided with notches having inclined ends, a friction plate also loose on said axle and mounted thereon to one side of the wheel, a wedging connection between the plate and the frame, said wedging connection, when the wheel is turned in one direction to lower the load, constructed to be tightened, whereby the plate is thrown in firm frictional contact against the adjacent side of the wheel, and said wedging connection, when the wheel is rotated in the opposite direction to raise the load, adapted to be loosened, a collar fixed on the main axle, said collar formed or provided with teeth having inclined ends, adapted to register with the inclined notches of the chain wheel and to have a slight play therein, the wedging connection thereby formed adapted, when the wheel is turned in the direction to lower the load, to be loosened or disengaged simultaneously with the tightening or engaging of the first-named wedging connection, and to be tightened or engaged to act against the adjacent side of the wheel, as said wheel is turned in the opposite direction to raise the load, simultaneously with the loosening of said first-named wedging connection, and a lifting sheave, the downward pull of the load thereon, when the chain wheel is in the state of inertia, adapted to turn the main axle, and thereby tighten both wedging connections, and prevent the descent of the load, substantially as set forth.

3. In an automatic brake for pulley blocks, the combination, of a frame of a pulley block, provided with a fixed part having an inclined surface, a main axle passing freely through the frame, a friction plate through which the main axle passes freely, said plate provided with oppositely beveled or inclined surfaces adapted to register with the inclined surface of the fixed part, and thereby form a wedge, a chain wheel on the pulley block axle, said wheel adapted, when rotated in one direction, to turn the plate limitedly, said plate when turned limitedly in one direction being forced, through the medium of the registering inclines or bevels laterally against the chain wheel, and when turned in the opposite direction being released from forcible engagement with said chain wheel, substantially as set forth.

4. In an automatic brake for pulley blocks, the combination, of a frame of a pulley block provided with a fixed part having an inclined surface, a main axle passing freely through the frame, a friction plate through which the main axle passes freely, said plate provided with oppositely beveled or inclined surfaces adapted to register with the inclined surface of the fixed part, and thereby form a wedge, a limiting stop or stops for the wedge, a chain wheel upon the main axle, said wheel adapted, when rotated in either direction, to turn the plate limitedly, said plate when turned limitedly in one direction being forced, through the medium of the registering inclines, laterally against the chain wheel, and when turned in the opposite direction being released from forcible engagement with said chain wheel, substantially as set forth.

5. In an automatic brake for pulley blocks, the combination of a main axle, a pulley block frame having a fixed part formed or provided with an inclined surface, a chain wheel mounted loose on the axle, and provided with notches having inclined ends, a friction plate between the wheel and the inclined surface of the fixed part, through which plate the main axle passes freely, said plate provided with an inclined surface registering with the inclined surface of the fixed part, and a collar splined on the main axle, said collar formed or provided with teeth having inclined ends adapted to register with the inclined notches of the chain wheel, and to have a slight play therein, substantially as set forth.

6. In an automatic brake for pulley blocks, the combination, of a main axle, a pulley block frame having a fixed part formed or provided with an inclined surface, a chain wheel mounted loose on the axle and provided with notches having inclined ends, a friction plate between the wheel and the inclined surface of the fixed part, through which plate the main axle passes freely, said plate provided with an inclined surface registering with the inclined surface of the fixed part, a collar splined on the main axle, said collar formed or provided with teeth having inclined ends, adapted to register with the inclined notches of the chain wheel, and to have a slight play therein, and a nut on the end of the main axle, adapted to be turned against the collar, substantially as set forth.

7. In an automatic brake for pulley blocks, the combination of a main axle, a pulley block frame having a fixed part formed or provided with an inclined surface, a chain wheel mounted loosely on the axle and provided with notches having inclined ends, a friction plate between the wheel and the inclined surface of the fixed part, through which plate the main axle passes freely, said plate provided with an inclined surface registering with the inclined surface of the fixed part, a collar splined on the main axle, said collar formed or provided with teeth having inclined ends, adapted to register with the inclined notches of the chain wheel, and to have a slight play therein, an adjusting nut on the end of the main axle adapted to be turned against the collar, said nut provided with annularly arranged radial teeth, and a screw adapted to be passed between the space of any two of the teeth, and to enter the face of the collar, substantially as set forth.

In testimony whereof I affix my signature in presence of two witnesses.

EDWARD Y. MOORE.

Witnesses:
ARTHUR L. MORSELL,
ANNA V. FAUST.